July 8, 1969    E. D. WILKIN    3,453,732
PORTABLE BRUSH CUTTER

Filed Sept. 1, 1967    Sheet 1 of 4

INVENTOR
ELLSWORTH DONOVAN WILKIN

BY Burns, Doane, Benedict,
Swecker & Mathis

ATTORNEYS

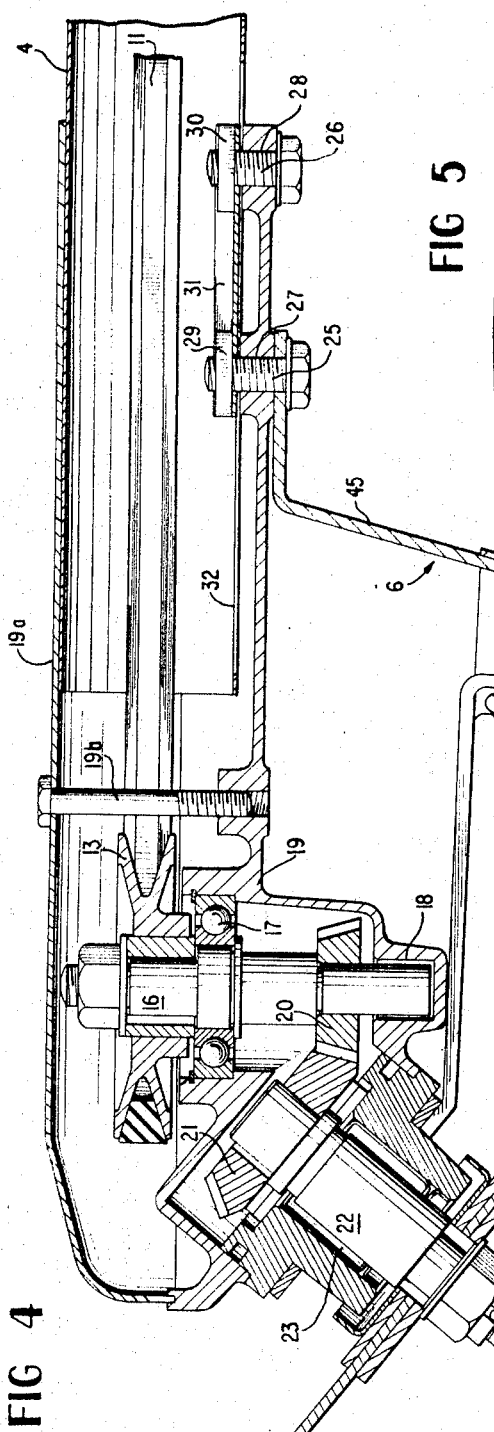
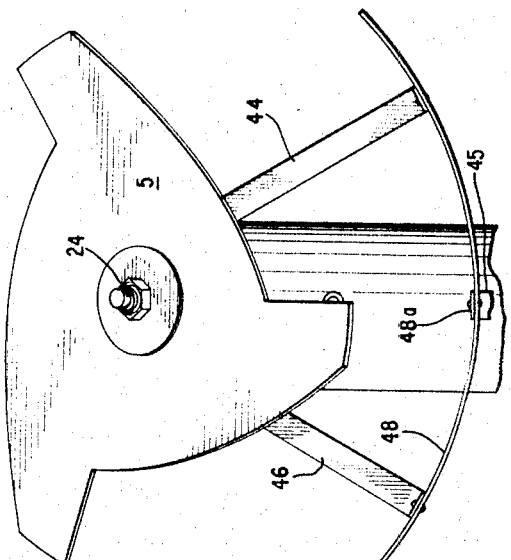
FIG 4
FIG 5
INVENTOR
ELLSWORTH DONOVAN WILKIN
ATTORNEYS

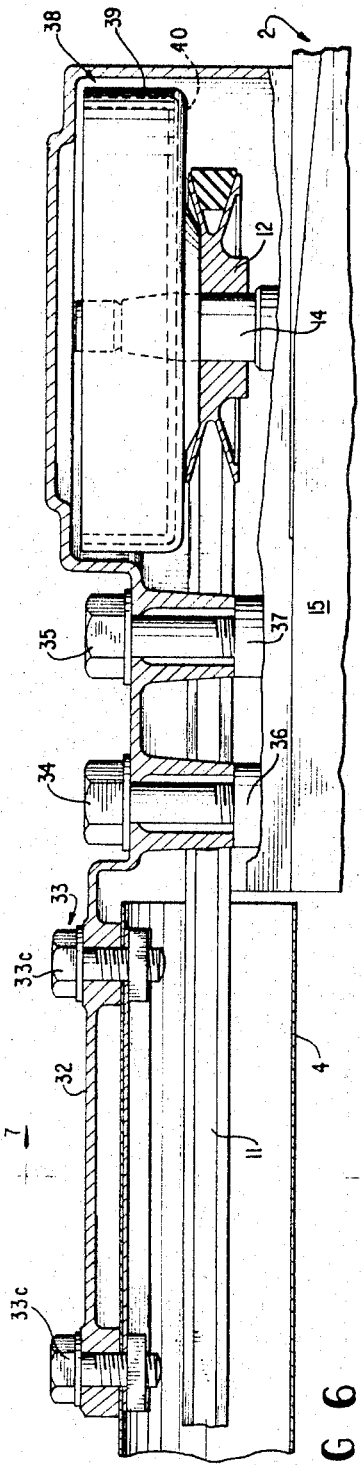
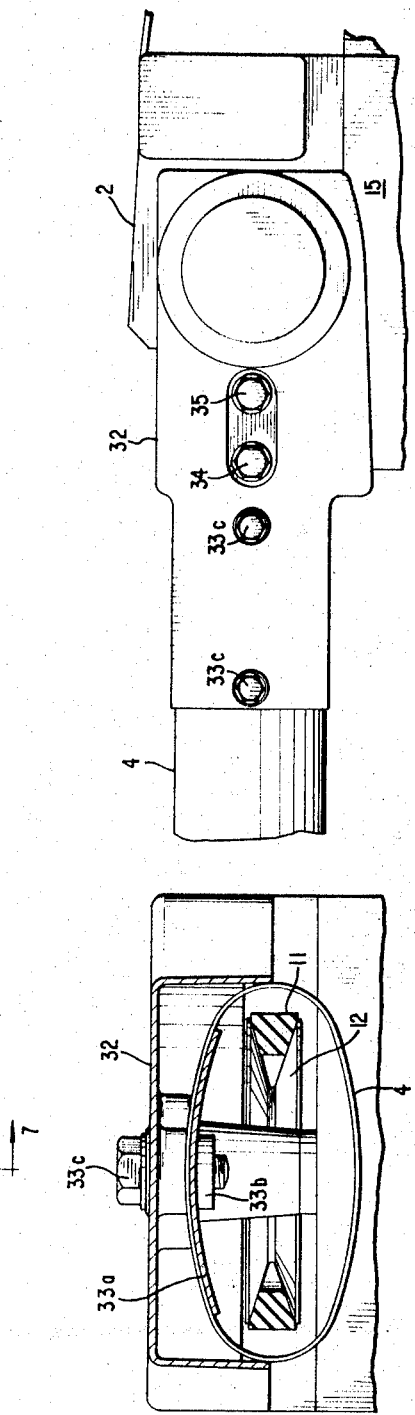

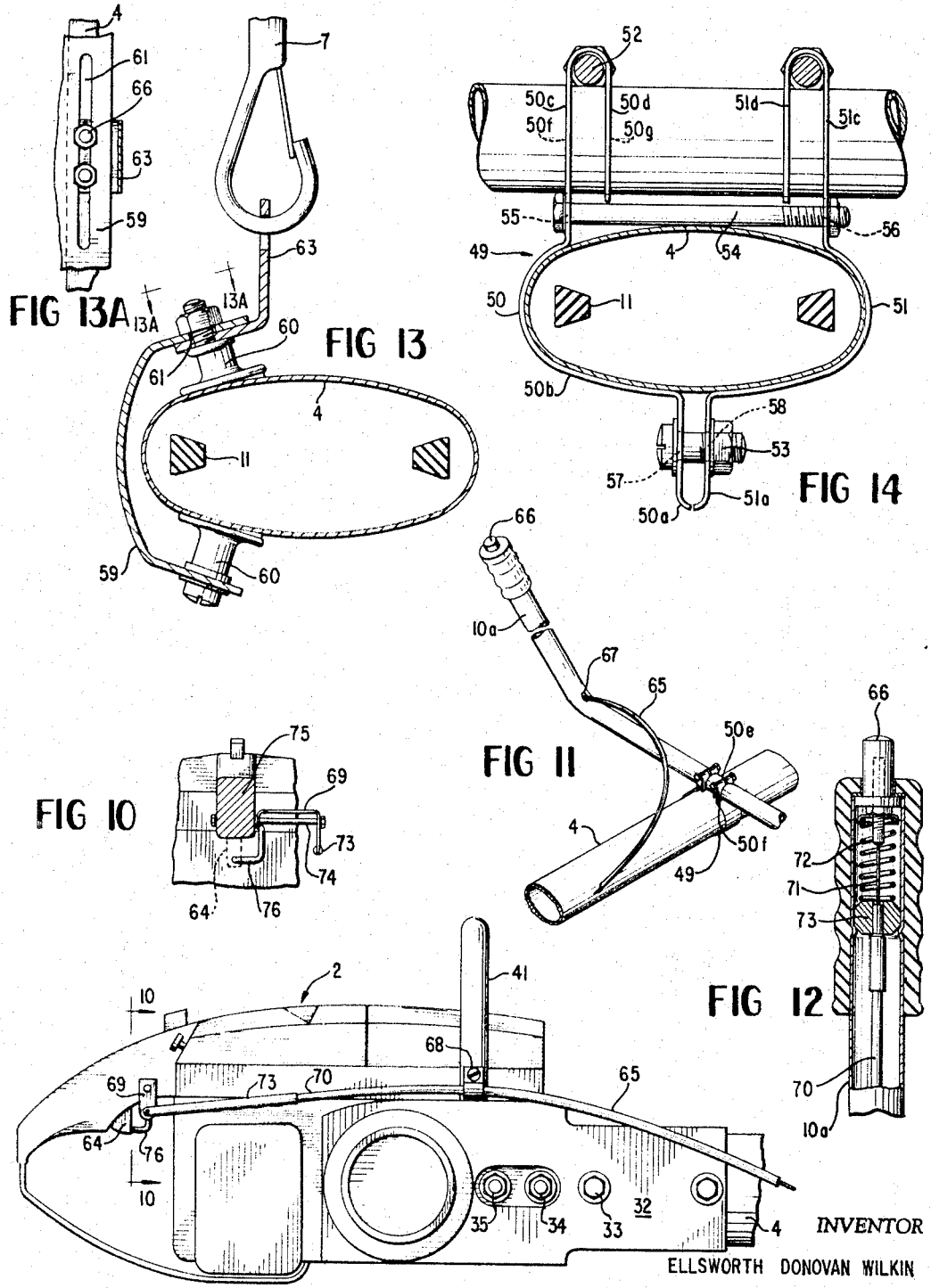

United States Patent Office 3,453,732
Patented July 8, 1969

3,453,732
PORTABLE BRUSH CUTTER
Ellsworth D. Wilkin, Los Angeles, Calif., assignor to McCulloch Corporation, Los Angeles, Calif., a corporation of Wisconsin
Filed Sept. 1, 1967, Ser. No. 665,099
Int. Cl. B26b 27/00, 25/00
U.S. Cl. 30—296          5 Claims

ABSTRACT OF THE DISCLOSURE

A preferred embodiment of the apparatus includes an internal combustion engine, a straight, axially elongate, conduit and a rotary brush-cutting blade. The conduit has a transverse cross-section which is elongate in one direction. The conduit is connected at one of its ends to the engine and supports the blade at its other end. A V-belt passes through the conduit and is mounted in driven relationship with the engine and driving relationship with the blade. A U-shaped handle is slidably mounted on the conduit with the elongate transverse cross-section of the conduit preventing handle rotation about the conduit axis.

---

This invention relates to a portable brush cutter. In particular, it relates to a light-weight brush cutter powered by a small gasoline engine, with a cutting blade being driven by a drive belt mechanism.

GENERAL BACKGROUND OF THE INVENTION

In recent years, considerable effort has been expended in developing portable brush-cutting units. Portable brush cutters powered by small engines are featured, for example, in U.S. Ibelle et al. Patent No. 2,810,409 and the U.S. Haug Patent No. 2,815,050. In both the Ibelle and Haug brush cutters, a tubular conduit of circular cross-section serves as a power-transmitting tube extending between an engine and a brush cutting blade.

The circular cross-section of these tubes consumes greater lateral space than is necessary to accommodate belt-drive mechanisms. In addition, handles mounted on the tubes are vulnerable to undesired rotation about the tubular axis.

Further, the circular cross-section of the Ibelle and Haug tubes fails to provide economical tube strength, transversely of the axis of rotation of the cutter blade.

It is an object of the present invention to provide an improved portable brush cutter which effectively obviates the shortcomings of previously developed units as discussed above.

Specifically, it is an object of the invention to provide a portable brush cutter including a power transmitting conduit which is generally elongate in transverse cross-section so as to provide economical transverse strength, economize on structural bulk, and provide a handle supporting base which effectively constrains a handle telescopingly mounted on the conduit from rotating about the conduit axis.

A further object of the invention is to provide an improved brush cutter characterized by a unique web clamp which serves to both clamp a handle against a power transmitting tube for selective adjustment longitudinally of the tube and mount the handle for selective rotation about an axis extending transversely of the conduit.

It is likewise a principal object of the invention to provide a unique arrangement which enables a brush cutter to be stably supported on three points with the cutting blade spaced from the supporting surface and while utilizing a straight power transmitting conduit.

It is likewise an object of the invention to provide such an improved brush cutter which is characterized by overall structural simplicity, ease of fabrication, and operational reliability.

GENERAL SUMMARY OF INVENTION

One major aspect of the invention resides in the combination including portable engine means and axially elongate, straight conduit means mounted at one end portion on the engine means. This conduit means has a generally elongate transverse cross section direction. Rotary blade means is mounted on the other end of the conduit means. Flexible belt means mounted within the conduit means is disposed in driven engagement with the engine means and driving engagement with the blade means. This belt means is mounted to travel in general alignment with the plane extending in the elongate direction of the transverse cross-section of the conduit means. The brush cutter includes generally U-shaped handle means and handle mounting bracket means telescopingly assembled on the outer periphery of the conduit means for selectively adjustable, axial sliding movement therealong. The conduit means, because of its elongate transverse cross-section, constrains the bracket means against rotation about the longitudinal conduit means axis. Selectively adjustable pivot mounting means secures the handle means to the bracket means for pivotable movement about an axis extending generally parallel to the travel plane of the belt means.

Another independently significant facet of the invention resides in the aforesaid combination of engine means, conduit means and rotary blade means in conjunction with a unique, three-point, brush cutter support. Two of these three points are provided by an engine handle mounted on the outer periphery of the engine means. A cutter shroud mounted on the conduit means includes a curved edge which provides the third support point.

A still further independently significant facet of the invention resides in the characteristics of the brush cutter clamp means which serves to provide the handle mounting bracket and the pivot mounting means. This clamp means includes a pair of web means disposed in generally mirror image relationship so as to be also generally parallel to the outer periphery of the conduit means. Each such web means includes a first portion which extends outwardly of the outer periphery of the conduit means, a second portion encircling a side portion of the conduit means, a third portion extending from the second portion outwardly of the periphery of the conduit means and generally away from the first portion, and a fourth portion extending from the outer extremity of the third portion generally back toward the outer periphery of the conduit means.

A slot is formed in the united outer extremity of the third and fourth portions. A handle clamping aperture is formed in the third portion and communicates with the slot. First clamping means carried between the outer extremities of the third and fourth portions of the web means serves to transversely compress the web means. This compression tends to close the slot and thereby constrict the aperture about the handle means which extends through the apertures of the third portions of each of the web means.

Second clamp means extending transversely of, and interconnecting, the first and third portions of each of the web means is operable to draw the first portions of the web means together and the third portions of the web means together to thereby clamp the second portion of the web means about opposite side portions of the conduit means.

DRAWINGS

In describing the invention, reference will be made to a preferred embodiment shown in the appended drawings.

Figure 1:
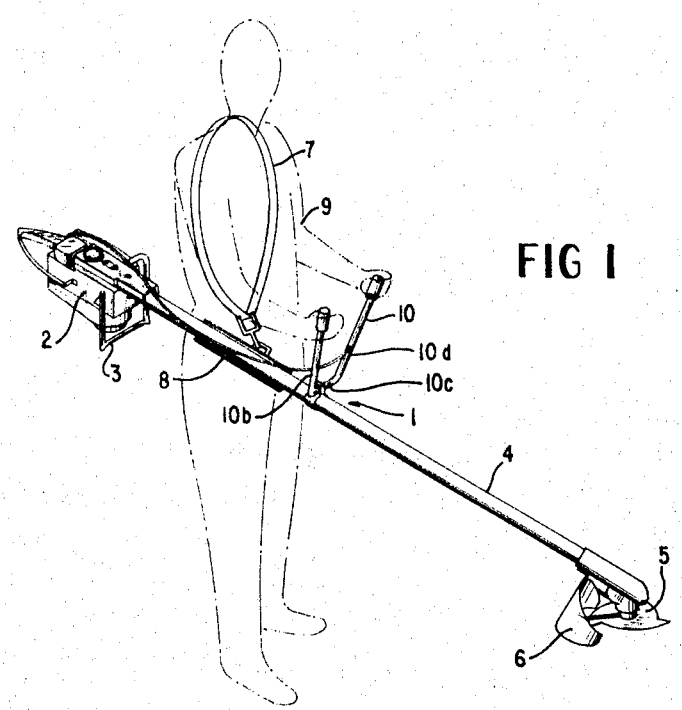
FIGURE 1 is a perspective view illustrating the manner in which a workman supports and manipulates the preferred brush cutter embodiment.
Figure 2:
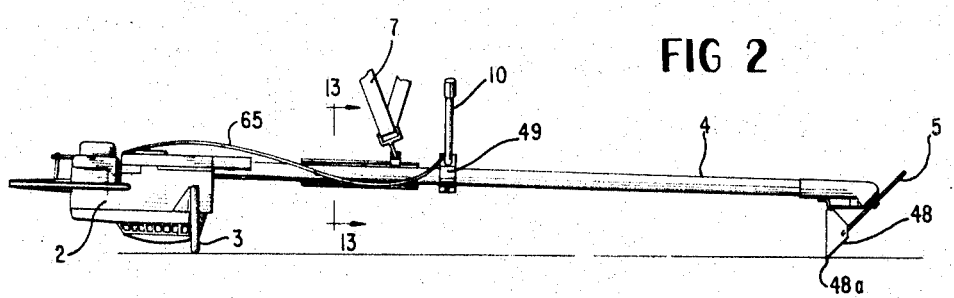
FIGURE 2 is an elevational side view illustrating the manner in which the brush cutter is supported by an engine handle and a blade shroud for starting or storage purposes.
Figure 3:
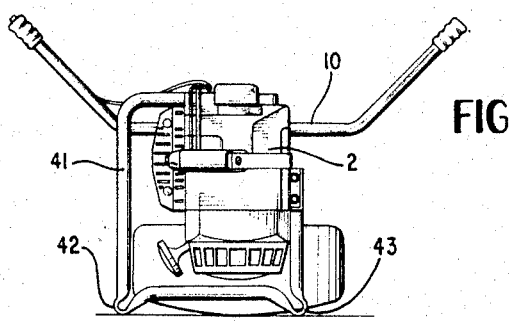

FIGURE 3 provides an enlarged end view of the engine disposed as shown in FIGURE 2, facing the engine end of the brush cutter;

FIGURE 4 provides an enlarged, longitudinally sectioned view of the blade bearing end of the power transmitting conduit of the FIGURE 1 brush cutter;

FIGURE 5 provides a substantially plan view of the cutting blade area of the engine, viewed in the view direction A of FIGURE 4;

FIGURE 6 provides an enlarged, longitudinally sectioned, view of the power transmitting conduit of the FIGURE 1 brush cutter in the vicinity of the driving engine;

FIGURE 7 provides a transverse sectional view of the power transmitting conduit illustrating the manner in which the conduit is mounted on a conduit continuation defining housing which serves to connect the conduit to the engine body, as viewed along section line 7—7 of FIGURE 6;

FIGURE 8 provides a plan view of the housing shown in section in FIGURE 6 which interconnects the power transmitting conduit to the engine body;

FIGURE 9 provides an elevational view of the FIGURE 1 engine illustrating the manner in which a control cable serves to effect remote actuation of a conventional, engine operating trigger;

FIGURE 10 provides a transverse sectional view of the trigger actuating mechanism of FIGURE 9 as viewed along section line 10—10;

FIGURE 11 provides a perspective view of a portion of a U-shaped handle mounted on the power transmitting conduit, illustrating the arrangement of a control cable in relation to one leg of the handle;

FIGURE 12 provides an internal view of the handle leg shown in FIGURE 11 illustrating the manner in which a control button serves to selectively actuate a control cable;

FIGURE 13 provides a transverse sectional view of the power transmitting conduit as viewed along the section line 13—13 of FIGURE 2 and illustrates details of a heat shield carried by the conduit which provides a mounting ear for a shoulder harness.

FIGURE 13a provides an enlarged plan view of an adjustable mounting arrangement for the FIGURE 13 heat shield, viewed along the view direction 13a—13a of FIGURE 13; and FIGURE 14 provides an enlarged transverse sectional view of the power transmitting conduit illustrating a clamping arrangement which provides a mounting bracket to secure a U-shaped handle to the conduit and a pivot mount to enable the handle to rotate about an axis extending transversely of the conduit.

Basic overall structure

The brush cutter 1, as shown generally in FIGURES 1 and 2, includes a portable gasoline operated engine 2, an engine handle 3, a power transmitting, straight conduit 4, and a generally planar brush cutting blade 5. A blade shielding shroud 6 is mounted on the end of the conduit 4 generally adjacent the blade 5. The other end of the conduit 4 is secured to the body of engine 2.

A shoulder harness 7 is connected with a heat shield 8 interposed between the operator 9 and the side of the conduit 4. A U-shaped handle 10 is mounted upon the conduit 4, with the two handle legs 10a and 10b being grasped by the operator as schematically shown.

With the operator 9 supporting the brush cutter 1 as shown in FIGURE 1, the blade 5 may be disposed generally parallel to the ground where brush cutting is to be effected. With the blade 5 thus disposed, conduit 4 inclines downwardly from the engine 2 toward the blade 5.

Engine 2 is an engine of the type used to drive portable chain saws. Usually such engines are internal combustion, gasoline operated engines.

The design of an engine uniquely suited for this purpose is shown in U.S. Design Patent D–204,360.

Engine drive

As shown in FIGURES 4, 6, 7 and 8, conduit 4 serves as a housing for a reinforced rubber V-belt 11. Belt 11 is mounted in driving relation with the blade 5 and in driven relation with the engine 2. Conduit 4 is oval in cross-section, with the elongate direction X shown in FIGURE 7 being generally parallel to the plane of blade 5. Belt 11 is supported on an engine driven pulley 12 and a blade driving pulley 13 so that the belt flights travel in a travel plane generally aligned with the direction X.

Pulley 12 is mounted on a shaft 14 which projects laterally outwardly of the housing 15 of engine 2. Pulley 13 is mounted on a shaft 16 which is journaled by conventional ball bearing means 17 and a socket 18 in a cast housing unit 19. Unit 19 defines a continuation of conduit 4.

A bevel gear 20 keyed to shaft 16, as pulley 13 is keyed to shaft 16, serves to transmit torque from the driven shaft 16 to a mating bevel gear 21. Bevel gear 21 is in turn keyed to a shaft 22. Shaft 22 is disposed with its axis of rotation co-planar with the axis of rotation of shaft 16 and inclined relative to this latter axis. Shaft 22 is journaled in housing 19 by conventional bushing or bearing means 23. Blade 5 is clamped to shaft 22 by conventional threaded clamping means 24.

Housing 19 is secured to the outer extremity of conduit 4 by a pair of threaded fasteners 25 and 26. These fasteners intersect housing apertures 27 and 28 and engage threaded nuts 29 and 30, respectively. Nuts 29 and 30 may be carried on a clamping plate 31. Thus, with the fasteners 25 and 26 fully engaged with the threaded nuts 29 and 30, the conduit 4 is clamped between the plate 31 and the housing 19. As illustrated, threaded nuts 25 and 26 may pass through a longitudinal slot 32 in the housing 4 so as to enable the position of the pulley 13 to be selectively adjusted longitudinally of the conduit 4.

With housing 19 thus secured, access to pulley 13 may be obtained by removing a housing closure 19a. Closure 19a may be secured by a threaded fastener 19b as shown in FIGURE 4.

The other end of conduit 4 is connected to another cast housing 32 by a threaded fastener and clamping mechanism 33. This clamping mechanism is substantially the same as the clamping plate and threaded fastener mechanism which serves to connect the conduit 4 with the housing 19. Mechanism 33 includes a back-up or clamping plate 33a disposed on the inside of conduit 4, conforming to the curvature of the interior of conduit 4, and supporting threaded nuts 33b. Nuts 33b are engaged by threaded bolts 33c as shown in FIGURE 6.

Housing 32, which also defines a continuation of conduit 4, is connected by threaded fasteners 34 and 35 to internally threaded bosses 36 and 37 formed on the outer periphery of the engine housing 15.

Pulley 12 may be mounted for free wheeling rotation on shaft 14 with a centrifugal clutch mechanism 38 providing a driving connection between the shaft 14 and the pulley 12 when adequate engine speed has been attained. Such a clutch mechanism includes a clutch drum 39 secured to, and rotatable with, the pulley 12 and a centrifugally actuated, clutch shoe carrying hub 40 keyed to the shaft 14. Such a clutch shoe mechanism is described, for example, in United States Collins Patent No. 3,385,411.

With this overall drive arrangement, rotation of the engine shaft 14, when sufficient engine speed has been attained, induces rotation of the pulley 12. This in turn causes movement of the power transmitting belt 11 and thus rotation of the blade driving pulley 13.

As shown in FIGURE 7, the flights of the power transmitting belt 11 are disposed so as to travel on opposite sides of the housing mounting bosses 36 and 37 and the associated fastening members 34 and 35 as well as on opposite sides of fastener 19a.

Rest and/or starting support arrangement

Brush cutter 1 is provided with a unique supporting arrangement which enables this apparatus to be stably supported for storage purposes or starting purposes, with the blade spaced safely above the supporting surface.

The supporting structure includes engine handle 3. As shown in FIGURE 3, handle 3 is fabricated from a tubular member 41 and is generally G-shaped in configuration. Handle member 41 is secured by conventional threaded fastening means to the engine body 15 as generally shown in FIGURES 2, 3 and 12. The base leg of the G-contour of handle 41 is provided with crimped corners so as to define a pair of spaced support points 42 and 43. These support points are disposed in a plane generally parallel with the travel plane X of the drive belt 11.

The third support point of the brush cutter supporting arrangement is provided by a blade shroud or shield 6. Shroud 6 comprises three support brackets 44, 45 and 46 which extend from housing 19 to support a curved, shield-like, sheet metal shield 47. Shield 47 includes a curved edge 48 lying in a plane generally parallel to the plane of blade 5 but spaced outwardly from the blade 5. In other words, the edge 48 is arranged so that the plane of the blade 5 is disposed between the edge 48 and the tubular member 4.

With this shroud arrangement, an operator may support the brush cutter, as shown in FIGURE 1, with the blade 5 and shroud edge 48 generally parallel to ground surface. This provides cutting action parallel to the ground along with optimum operator shielding. When it is desired to support the brush cutter 1 on a supporting surface as, for example, when the engine 2 is to be started, the brush cutter is rested as shown in FIGURES 2 and 3. In this position the brush cutter is stably supported by three points, including the handle-defined support points 42 and 43 and a third support point 48a defined by the center of the edge 48.

With the brush cutter thus supported, both the engine 2 and blade 5 are spaced from the ground surface with the handle 10 projecting upwardly from the conduit 4 and generally away from the ground surface.

Handle mounting arrangement

FIGURES 1, 11 and 14 illustrate structural details of web-defined, mounting means 49 which serves to secure the handle 10 to the power transmitting conduit 4.

As shown in FIGURE 14, mounting means 49 is fabricated from a pair of web units 50 and 51 which are disposed in parallel relationship with the conduit 4 and which face each other in a mirror image relationship with respect to this conduit.

With web units 50 and 51 being identical in structure, details of web unit 50 only will be described in detail. Thus, web 50 includes a first portion 50a which projects generally outwardly of the conduit 4. A second web portion 50b extends from first portion 50a and wraps conformingly about a side portion 4a of conduit 4. A third web portion 50c extends from second portion 50b generally away or outwardly of conduit 4 in a direction generally opposite to the projecting direction of web portion 50a. At the terminus or outer extremity of the web portion 50c, web 50 deflects backwardly toward conduit 4 to provide a fourth web portion 50d generally parallel to, but spaced from, the third portion 50c.

At the outer, united extremities, of web portions 50c and 50d, a slot 50e extends partially inwardly of these web portions toward the conduit 4. Slot 50e intersects a handle receiving, circular aperture 50f formed in web portion 50c and another aperture 50g formed in web portion 50d in coaxial alignment with aperture 50f. As will be apparent by reference to FIGURES 1 and 14, the central handle portion 10c passes through the aligned apertures 50f and 50g.

A conventional threaded fastener 52 which passes between web portions 50c and 50d at their interconnected and slotted termini provides means for selectively closing or narrowing the slot 50e so as to constrict the edges of the apertures 50f and 50g about the handle portion 10c. Fastening means 52 may comprise a conventional threaded nut and bolt disposed as shown in FIGURES 11 and 14. In this arrangement, the head of the bolt and the nut engage opposite edges of the connected termini of the web portions 50c and 50d. Threading the nut onto the bolt will tend to compress the opposite edges of these web portions so as to close the slot 50e.

The constricting of apertures 50f and 50g serves to clamp the web portions 50c and 50d to the handle 10 so as to prevent rotation of the handle about an axis extending parallel to the plane X but generally perpendicular to a longitudinal median plane of the conduit 4 which is itself perpendicular to the plane X. Loosening of this threaded fastener 52, of course, will serve to release the web 50 from the handle 10 so as to permit selective rotational adjustment of the handle.

As will be apparent, handle portion 10c is interconnected with web portions 51c and 51d in exactly the same way that this handle portion is connected with web portions 50c and 50d.

With the web means 50 and 51 disposed on conduit 4 as shown in FIGURE 14, they are secured in selective clamping relationship to the conduit 4 by a pair of threaded fastening means 53 and 54. Threaded fastener 54 passes through apertures 55 and 56 in web portions 50c and 51c respectively. Threaded fastener 53 passes through aperture portions 57 and 58 in web portions 50a and 51a respectively. Each fastening means 53 and 54 comprises a threaded bolt and nut. By advancing the nut onto the bolt of each fastener, the web means 50 and 51 are constricted or clamped about the conduit 4.

By loosening one or both of the fasteners 53 and 54, the interconnected web means 50 and 51 may be loosened sufficiently to enable the handle 10 and overall clamp means 49 to be selectively adjusted axially of the conduit means 4.

Miscellaneous structure of significance

Brush cutter 1 may be provided with a heat shield 8 extending parallel to but spaced from the conduit tube 4. Structural details of this heat shield are shown in FIGURES 13 and 13a.

The heat shield is utilized to protect an operator from the heated periphery of the conduit 4 occasioned, for example, by engine heat transmitted along this conduit.

Heat shield 8 includes a plate 59 which is generally C-shaped in cross-section and which is mounted on a plurality of threaded mounting studs 60 as generally shown in FIGURES 13 and 13a. Mounting studs 60 are secured by conventional fastening techniques to the outer periphery of conduit 4. Heat shield 59 may be provided with mounting slots 61 and 62 to facilitate the axial adjustment of harness support clip 63 so that the clip may be secured at the balance point of the brush cutter.

The harness support clip 63 is secured to the heat shield 59 by screws and nuts 66.

This clip 63 provides a mounting arrangement by means of which the conventional shoulder harness 7 may be secured to the brush cutter 1.

FIGURES 9 through 12 illustrate the manner in which an engine throttle control cable is uniquely incorporated in the handle 10 and arranged to operate the conventional throttle controlling engine trigger 64.

A conventional control cable 65 passes from a control button 66 in handle leg 10a to a handle aperture 67. Cable 65 emerges from handle aperture 67, is clamped to engine 2 by a conventional treadably secured cable clamp 68, and is connected with a trigger actuating yoke 69.

Control cable 65 includes a sheath 70 and a wire-like control rod 71 slidably mounted within this sheath. Wire 71 is connected with control button 66 as shown in FIGURE 12. A conventional coil spring 72 serves to yieldably maintain the control button 66 in its projected, illustrated position. Sheath 70 is anchored in place by a conventional anchoring plug 73. A clamp 68 serves to anchor the sheath 70 in the general vicinity of the yoke 69. Wire 71 issues from sheath 70 and terminates in an enlarged rod-like end 73.

Terminus 73 is pivotally connected with the yoke 69 which is supported for swiveling movement on a shaft 74. Shaft 74 projects laterally from an engine housing portion 75 in the vicinity of the throttle trigger 64. A finger 76 carried by yoke 69 operably engages the trigger 64.

By pressing the button 66 into the handle leg 10a, the control wire 71 is moved generally toward the trigger 64 so as to cause the yoke 69 to pivot toward the trigger 64. This pivotable movement causes the finger 76 to press against the trigger 64 and move the trigger so as to actuate the engine throttle.

*Advantages and scope of the invention*

A principal advantage of the invention resides in the novel power-transmitting conduit means 4. The laterally elongate character of this conduit affords maximum strength in a direction laterally of the axis of rotation of the blade 5. Thus, the conduit 4 uniquely and effectively resists lateral force created by the cutting action of the blade 5.

Further, the vertically thin character of the conduit 4 economizes on space and reduces the overall bulk of the brush cutter 1.

The elongate transverse cross section of the power transmitting conduit provides a structurally simple, yet effective, mechanism for mounting the handle 10. This mounting arrangement enables the handle to be axially adjusted while positively preventing rotation of the handle about the longitudinal axis of the conduit.

The utilization of the blade shield in combination with an engine handle to provide a three point, engine mounting structure enables the brush cutter to be safely supported for starting purposes. With this arrangement, the blade serves to support the blade end of the brush cutter while at least partially shielding the operator from the blade while the engine is being started. This three point mounting arrangement, which effectively spaces the blade above the supporting surface, is accomplished without resorting to structurally complex, articulated or inclined power-transmitting systems.

The handle clamping arrangement uniquely accommodates both sliding and rotational adjustment of the handle while maintaining minimum apparatus bulk. The web defined handle mounting structure is characterized by basic ease of fabrication and functional reliability.

The heat shield is effectively dually employed as a shield and a shoulder harness mount so as to further reduce structural complexity.

An overall consequence of these advantages is the obtaining of a structurally simply, extremely lightweight portable brush cutter while maintaining optimum operator safety.

In describing the invention, reference has been made to a preferred embodiment of the brush cutter apparatus. However, those skilled in the art and familiar with this disclosure may recognize additions, deletions, substitutions or other modifications which would fall within the purview of the overall invention as defined in the appended claims.

I claim:
1. A portable brush cutter comprising:
portable engine means;
axially elongate, straight conduit means mounted at one end portion on said engine means, said conduit means having a generally elongate, transverse cross-section direction;
rotary blade means mounted on the other end of said conduit means;
flexible belt means mounted within said conduit means in driven engagement with said engine means and driving engagement with said blade means;
said belt means being mounted to travel in general alignment with a travel plane extending in the elongate direction of the transverse cross-section of said conduit means;
generally U-shaped handle means;
handle mounting bracket means telescopingly assembled on the outer periphery of said conduit means for selectively adjustable axial sliding movement therealong, with said conduit means constraining said bracket means against rotation about the longitudinal conduit means axis; and
selectively adjustable pivot mounting means securing said handle means to said bracket means for pivotable movement about an axis extending generally parallel to the travel plane of said belt means.

2. A brush cutter comprising:
portable engine means;
straight and axially elongate conduit means mounted at one end on said engine means and extending away therefrom;
rotary blade means mounted on the other end of said conduit means and inclined relative to the longitudinal axis of said conduit means so as to be generally parallel to a ground surface with said conduit means inclining downwardly from said engine means toward said rotary blade means;
drive means contained within said conduit means in driven engagement with said engine means and driving engagement with said rotary blade means;
engine handle means mounted on the outer periphery of said engine means and defining a pair of spaced support points; and
cutter shroud means mounted on said conduit means and having a curved edge lying in a plane generally parallel to said ground surface when said blade means is disposed in generally parallel relationship to said ground surface, with the plane of said edge being disposed between the ground and said blade means;
said curved edge providing a third support point which cooperates with said engine handle defined support points to support said brush cutter with said rotary blade means spaced above the ground.

3. A brush cutter comprising:
portable engine means;
axially elongate straight conduit means mounted at one end on said engine means and extending away therefrom;
rotary blade means mounted on the other end of said conduit means;
drive means contained within said conduit means and disposed in driven relationship with said engine means and driving relationship with said blade means;
handle means;
clamp means securing said handle means to said conduit means for selectively adjustable axial sliding movement along said conduit means and for rotation about an axis extending transversely of said conduit means, said clamp means including a pair of web means, each being generally parallel to the outer periphery of said conduit means, said web means being mounted on opposite sides of said conduit means in mutually facing relation, and having a first portion extending outwardly of the outer periphery of said conduit means, a second portion encircling a side portion of said conduit means, a third portion extending from said second portion outwardly of the periphery of said conduit means and generally away from said first portion, a fourth portion extending from the outer extremity of said third portion generally back toward the outer periphery of said conduit means, a slot in the connected outer extremities of said third and fourth portions, a handle clamping aperture in said third portion communicating with said slot, and first clamping means carried between the outer extremities of the third and fourth portions of said web means and adapted to transversely compress said web means to tend to close said slot and thereby constrict said aperture about said handle means;

said handle means including a portion extending through the apertures of the third portions of each of said web means; and said clamp means further including second clamp means extending transversely of and interconnecting the first and third portions of each of said web means and operable to draw said first and third portions together to thereby clamp the second portions of said web means about opposite side portions of said conduit means.

4. A portable brush cutter comprising:

portable engine means;

axially elongate straight conduit means mounted at one end portion on said engine means, said conduit means having a generally elongate transverse cross-section direction;

rotary blade means mounted on the other end of said conduit means;

flexible belt means mounted within said conduit means in driven engagement with said engine means and driving engagement with said blade means;

said belt means being mounted to travel in general alignment with a travel plane extending in the elongate direction of the transverse cross-section of said conduit means;

generally U-shaped handle means;

clamp means securing said handle means to said conduit means for selectively adjustable axial sliding movement along said conduit means and for rotation about an axis extending transversely of said conduit means said clamp means including a pair of web means each being generally parallel to the outer periphery of said cutter means, said web means being mounted on opposite sides of said conduit means in mutually facing relation, and having a first portion extending outwardly of a first portion extending outwardly of the outer periphery of said conduit means, a second portion encircling a side portion of said conduit means, a third portion extending from said second portion outwardly of the periphery of said conduit means and generally away from said first portion, a fourth portion extending from the outer extremity of said third portion generally back toward the outer periphery of said conduit means, a slot in the connected outer extremities of said third and fourth portions, a handle clamping aperture in said third portion communicating with said slot, and first clamping means carried between the outer extremities of the third and fourth portions of said web means and adapted to transversely compress said web means to tend to close said slot and thereby constrict said aperture about said handle means;

said handle means including a portion extending through the apertures of the third portions of each of said web means;

said clamp further including second clamp means extending transversely of and interconnecting the first and third portions of each of said web means and operable to draw said first and third portions together to thereby clamp the second portions of said web means about opposite side portions of said conduit means;

engine handle means mounted on the outer periphery of said engine means and defining a pair of spaced support points; and cutter shroud means mounted on said conduit means and having a curved edge lying in a plane generally parallel to said ground surface when said blade means is disposed in generally parallel relationship to said ground surface, with the plane of said edge being disposed between the ground and said blade means;

said curve edge providing a third support point which cooperates with said engine handle defined support points to support said brush cutter with said rotary blade means spaced above the ground.

5. A brush cutter as described in claim 4, further including:

generally planar heat shield means;

bracket means connecting said heat shield means to the outer periphery of said conduit means, with said heat shield means extending generally parallel to said conduit means but spaced outwardly therefrom;

flexible harness means; and a mounting ear for said harness means extending from said heat shield means.

References Cited

UNITED STATES PATENTS

| | | | |
|---|---|---|---|
| 1,525,723 | 2/1925 | Davis. | |
| 2,697,457 | 12/1954 | Lawrence | 30—167 X |
| 2,722,955 | 11/1955 | Roy. | |
| 2,810,409 | 10/1957 | Ibell | 30—167 X |
| 3,346,955 | 10/1967 | Beneke | 30—276 |
| 3,353,268 | 11/1967 | Meltzer | 30—276 |

ROBERT C. RIORDON, *Primary Examiner.*

J. C. PETERS, *Assistant Examiner.*

U.S. Cl. X.R.

30—276; 143—43

UNITED STATES PATENT OFFICE
CERTIFICATE OF CORRECTION

Patent No. 3,453,732                      July 8, 1969

Ellsworth D. Wilkin

It is certified that error appears in the above identified patent and that said Letters Patent are hereby corrected as shown below:

Column 6, line 68, "couduit" should read -- conduit --. Column 9, line 58, "means", first occurrence, should read -- means, --; line 63, cancel "a first portion extending outwardly of". Column 10, line 21, after "clamp", first occurrence, insert -- means --.

Signed and sealed this 21st day of April 1970.

(SEAL)
Attest:

Edward M. Fletcher, Jr.

Attesting Officer

WILLIAM E. SCHUYLER, JR.

Commissioner of Patents